Sept. 13, 1955  W. G. GRUZENSKY ET AL  2,717,700
FLASK HOLDER FOR A MECHANICAL SHAKER
Filed Feb. 21, 1951
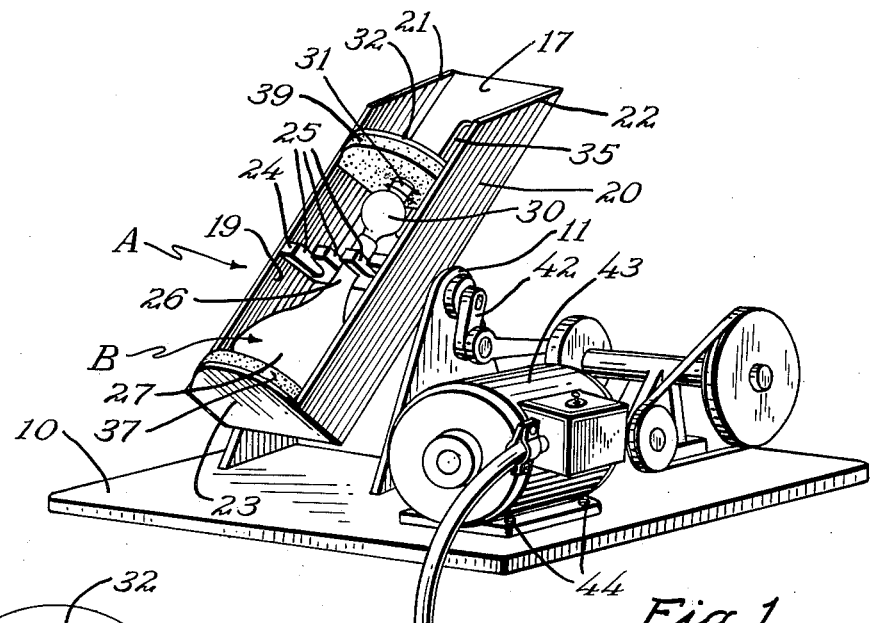
Fig. 1
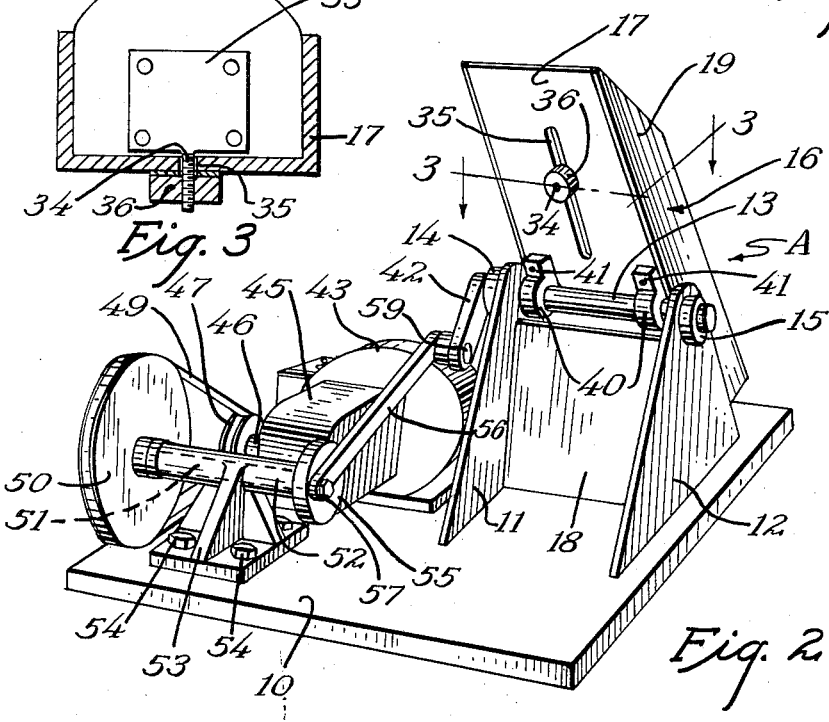
Fig. 3
Fig. 2
INVENTOR.
William G. Gruzensky
Charlotte M. Heotis
BY Robert M. Dunning
ATTORNEY United States Patent Office 2,717,700
Patented Sept. 13, 1955

2,717,700

FLASK HOLDER FOR A MECHANICAL SHAKER

William G. Gruzensky and Charlotte M. Heotis, Lincoln, Nebr.

Application February 21, 1951, Serial No. 212,140

1 Claim. (Cl. 211—74)

The present invention relates to an improvement in mechanical flask shaker and deals particularly with a device for shaking the contents of a volumetric flask.

In chemical laboratories, it is often necessary to shake the contents of a volumetric flask to thoroughly mix various solutions or to effectively dissolve solid materials. This work requires considerable time and effort which might better be employed in performing other tasks. It is therefore desirable to provide a low cost flask shaking apparatus which can perform this tedious task while the chemist pursues other work.

An object of the present invention lies in the provision of a simple flask shaking apparatus which will thoroughly shake the contents of one or more volumetric flasks. This task is accomplished by tilting the flask about an arcuate path so that the contents of the flask will be poured from one end of the flask toward the other. This shaking device not only serves to save considerable time, but also insures more uniform shaking than could possibly be obtained manually.

Authorities state that before the contents of a volumetric flask become uniform, the flask should be shaken at least one hundred times by inverting the stoppered flask, waiting until the solution has run down to fill the neck and then restoring the flask to an upright position and waiting until the contents has returned from the neck to the original position. In many instances, this operation requires at least three to four seconds for each complete cycle. Thus in order to properly mix the contents it would be necessary to shake the flask for from five to seven minutes. Oftentimes in order to cut down the time and energy necessary to completely mix the contents, the shaking operation is discontinued before the contents are thoroughly mixed, therefore resulting in an improper mixture.

A feature of the present invention lies in the provision of a shaking apparatus which functions much in the manner in which the flask might be shaken manually. The device includes a receptacle for containing the flask or flasks which is pivotally supported near a center point. This support is oscillated by a crank which is connected to a connecting rod powered by a rotary crank. As the flask tilts toward its extreme position at each end of the oscillation, the speed of movement is considerably reduced, thereby permitting the liquid within the flask to drain completely into one end or the other of the flask.

An added feature of the present invention lies in the construction of the particular support used for holding the flask during the shaking operation. This device includes an adjustable member which is movable to permit flasks of different sizes to be supported.

These and other objects and novel features of the present invention will be more clearly and fully set forth in the following specification and claim.

In the drawings forming a part of the specification:

Figure 1 is a perspective view of the shaking device showing the arrangement of parts therein.

Figure 2 is a perspective view showing the opposite side of the shaking device.

Figure 3 is a sectional view through the flask support showing the adjustable member used for holding the flasks in place.

The flask shaking apparatus is indicated in general by the letter A. This device is shown as including a base 10 upon which the various parts are mounted. Actually the various parts may be mounted upon a laboratory table or bench but the use of a base as illustrated is preferred.

A pair of generally triangular standards 11 and 12 are supported in parallel relation and generally vertical planes extending upwardly from the base 10. These standards 11 and 12 are preferably connected by a connecting panel 18 which holds the standards in properly spaced relation and serves to brace the same.

The standards 11 and 12 support a pivot shaft 13 which is freely rotatable relative to the standards. The shaft 13 is held from lateral movement relative to the standards 11 by any suitable means such as the collars 14 and 15.

Secured to the shaft 13 intermediate the standards 11 and 12, is provided a flask support 16. This support includes a base panel 17 and a pair of parallel side panels 19 and 20. The side panels 19 and 20 are preferably tapered in width at one end thereof, the tapered wall ends being indicated at 21 and 22 respectively. The support also includes a closed end 23 which connects the side walls 19 and 20 at the end thereof opposite the ends which are tapered. Intermediate the ends of the box and parallel to the end wall 23 is provided a partition 24 which includes a plurality of parallel slots 25. These slots 25 are designed to accommodate the necks 26 of volumetric flasks B. The flasks B are ordinarily provided with an enlarged bulbular lower end 27 connected by the neck 26 with the enlargement 30. The upper ends of the flasks are designed to accommodate a stopper 31 of suitable design to form a top closure for the flask.

The slots 25 in the partition 24 are designed to accommodate the necks of one or more flasks. In the drawings a single flask B is shown mounted in the support. In such an event the neck 26 of the flask is designed to extend in the intermediate slot of the three slots in question. However, if smaller flasks are employed, two such flasks may be accommodated, the necks 26 thereof extending through the slots 25 on either side of the center slot.

A movable partition 32 is supported between the side walls 19 and 20 upon the base wall 17. The partition 32 is connected by a suitable anchoring plate 33 or by any other suitable means to a threaded stud 34 which extends through a slot 35 directed longitudinally of the bottom panel 17. A thumb nut 36 is provided on the stud 34 by means of which the partition 32 may be clamped in any adjusted position.

A resilient cushioning pad of sponge rubber or other suitable material is indicated at 37 upon the bottom panel 23 of the shaking apparatus. A similar cushion pad 39 is provided upon the partition 32. The flask is actually clamped between the cushioning pads 37 and 39 so that the bulbular end 27 of the flask is recessed into the cushion pad 37 and so that the stopper 31 is recessed into the pad 39. In this way the stopper is firmly held from accidental displacement and the flask is firmly held within its support.

A pair of collars or sleeves 40 encircle the shaft 13 and are secured in fixed relation thereto. These collars are provided with anchoring flanges 41 secured by screws or other suitable means to the bottom panel 17 of the support. Thus the flask support is held for oscillating movement with the shaft 13. A crank 42 is mounted upon one end of the shaft 13 by means of which the shaft 13 and the support may be oscillated.

An electric motor or other suitable power supply is indicated at 43 and is mounted by bolts 44 or other suitable fastening means. A gear reduction unit 45 is secured to the motor 43 so as to greatly reduce the normal speed of rotation of the output shaft. The gear reduction unit 45 drives a shaft 46 at a relatively low speed such as for example 17 R. P. M. Thus the speed of oscillation is relatively slow so that the contents of the flask or flasks B may drain from one end to the other thereof.

A pulley 47 is mounted upon the shaft 46 for rotation therewith. This pulley 47 is connected by a belt 49 to a second pulley 50 mounted upon a counter-shaft 51. The counter-shaft 51 is supported in a bearing 52 supported by a bracket 53 mounted by bolts 54 or other suitable means to the base 10.

A disc or crank arm 55 is mounted upon the end of the shaft 51 opposite the end supporting the pulley 50. A connecting rod 56 is pivotally connected at 57 to the disc 55. The connecting rod 56 is also pivotally connected at 59 to the crank 42. Thus rotation of the disc 55 acts through the connecting rod 56 to oscillate the flask support and the flask or flasks contained therein.

It will be noted that as the support reaches either extreme position, the speed of movement of the flask is gradually reduced as the driving crank disc passes through dead center position. As a result the flask is held at or near extreme position for a relatively long period of time. As the crank moves farther from dead center position, the speed of motion increases so that the tilting action of the flask is relatively quick while the delay period at each end of the oscillation is relatively long. We have found that the desired mixing action is readily accomplished by rotating the crank disc at approximately seventeen R. P. M. and that the liquid has the necessary time to drain from one end of the flask to the other.

The maintaining of the flask in either extreme position is accentuated by action of the crank 42. This crank 42 is so arranged as to be operated at maximum speed as it passes the center of oscillation, thereby accentuating the action provided by the crank disc 55.

The flask will accordingly be held near each extreme position for a longer period of time than at any other position, thus permitting the contents to drain from one end of the flask to the other.

In disengaging the flask or flasks from the flask support, it is only necessary to stop the oscillation of the support, preferably when the support is tilted upwardly in the position shown in Figure 1. The thumb nut 36 is next loosened and the partition 32 moved toward the open end of the support. The flask may then be readily removed from the support.

In accordance with the patent statutes, we have described the principles of construction and operation of our mechanical flask shaker, and while I have endeavored to set forth the best embodiment thereof, we desire to have it understood that obvious changes may be made within the scope of the following claim without departing from the spirit of our invention.

We claim:

A flask holding apparatus for use in combination with an oscillating shaft, the apparatus including a platform, an end on said platform extending upwardly therefrom, generally parallel sides extending upwardly from said platform and secured to said end, a clamping member slidably supported between said sides for movement toward and away from said end, and means for securing said clamping member in adjusted position, and a partition between said end and said clamping member provided with a U-shaped slot of sufficient length to accommodate the respective necks of flasks having various sized bases.

References Cited in the file of this patent

UNITED STATES PATENTS

| | | |
|---|---|---|
| 709,819 | Hicks | Sept. 23, 1902 |
| 1,085,450 | Lopez | Jan. 27, 1914 |
| 1,203,202 | Kinsella | Oct. 31, 1916 |
| 1,340,660 | Lindberg | May 18, 1920 |
| 1,681,404 | Hardman | Aug. 21, 1928 |
| 1,770,173 | Hill | July 8, 1930 |
| 1,997,400 | Wysocki | Apr. 9, 1935 |